Nov. 25, 1969      R. R. JUNG      3,480,126
PALLET CONVEYOR WITH LOCK MECHANISM
Filed April 17, 1967                    2 Sheets-Sheet 1

*INVENTOR*
RICHARD R. JUNG

Nov. 25, 1969    R. R. JUNG    3,480,126
PALLET CONVEYOR WITH LOCK MECHANISM
Filed April 17, 1967    2 Sheets-Sheet 2

INVENTOR
RICHARD R. JUNG

United States Patent Office 3,480,126
Patented Nov. 25, 1969

3,480,126
PALLET CONVEYOR WITH LOCK MECHANISM
Richard R. Jung, Battle Creek, Mich., assignor to Clark Equipment Company, a corporation of Delaware
Filed Apr. 17, 1967, Ser. No. 631,362
Int. Cl. B65g 13/00
U.S. Cl. 193—35                                        4 Claims

ABSTRACT OF THE DISCLOSURE

A device for use in transporting loads along a supporting floor surface including a base member having a plurality of rollers rotatably supported on the upper surface thereof to receive a load thereon from a roller conveyor and the like. The device includes friction locking members supported by an overcenter linkage arrangement which is selectively operable to lock the rollers against rotation, and a manually operable lock releasing mechanism to release the locking means. Means, such as inflatable fluid pressure pads, are mounted on the underside of the device which adapt the device to be readily moved along the supporting surface with a minimum of frictional resistance.

BACKGROUND OF THE INVENTION

In the field of material handling, and in particular material handling systems utilizing roller conveyors for transporting heavy loads between work stations, it is frequently necessary to transport the load or article from the conveyor to other areas removed from the roller conveyor. Where material handling pallets are used to transport the heavy loads from the roller conveyors to other stations or areas, it is desirable to provide rollers on the upper surface of the pallet to allow the load to be readily moved onto the pallet. Means are preferably provided on the underside of the pallet which adapt it to then be readily moved along a supporting floor surface. Where the roller conveyors are raised from the level of the supporting floor surface to locate the articles being worked on for more convenient accessibility by the operators, similar rollers may be provided on the upper surface of the pallet at a level coplanar with the level of the roller conveyor platform. When a load is transferred from the roller conveyor onto the rollers of the pallet, it is desirable to provide means to prevent the load from rolling off the pallet during movement of the pallet and load to another work station or storage area.

SUMMARY OF THE INVENTION

Accordingly, it is one of the primary objects of the present invention to provide a material handling pallet having roller members rotatably supported adjacent the upper surface thereof to receive a load thereon, with locking means being provided to selectively engage the rollers and prevent rotation thereof.

Another object of the present invention is to provide a material handling pallet as above described including manually operable lock releasing means.

Another object of the present invention is to provide a material handling pallet as described wherein the locking means includes an overcenter linkage arrangement adapted to maintain the locking means in locking relation with the rollers after being initially moved to its locking position, and which may be manually released from the locking position.

A further object of the present invention is to provide a material handling pallet having a plurality of inflatable pads mounted on the underside of the pallet, conduit means for supplying fluid pressure to the pads, roller members rotatably mounted on the upper surface of the pallet to receive a load thereon, and locking means adapted to prevent rotation of the rollers when fluid pressure is supplied to the inflatable pads.

Another object of the present invention is to provide a material handling pallet as above described wherein the locking means includes an overcenter linkage arrangement adapted to maintain the locking means in locking relation after fluid pressure to the inflatable pads is terminated, and including manually operable lock releasing means.

In a preferred embodiment of a pallet constructed in accordance with the present invention, a base support member having an upper surface thereon is adapted to rotatably support a plurality of roller members adjacent the upper surface to receive a load thereon from a conventional roller conveyor and the like. Locking means, including a pair of friction locking members mounted on an overcenter linkage arrangement in generally transverse relation to the longitudinal axes of the rollers, are operable through a fluid pressure actuated piston assembly to engage the rollers and prevent rotation thereof. Means, such as a plurality of inflatable pads and associated fluid pressure supply conduits, are preferably mounted on the underside of the pallet which adapt the pallet to be readily moved along a supporting floor surface with minimum friction resistance. The fluid operated piston assembly is coupled to the fluid pressure supply system of the inflatable pads such that upon introducing fluid pressure into the pads, the friction locking members will be caused to engage the roller members in locking relation. The overcenter linkage arrangement is such that the friction locking members will be maintained in locking relation after being moved to their initial locking positions irrespective of the supply of fluid pressure to the actuating piston assembly. A manually operable lock releasing lever is operatively associated with the overcenter linkage arrangement to effect releasing of the friction braking members through actuation of the operating lever.

Further objects and advantages of my invention, together with the organization and manner of operation thereof, may best be understood by reference to the following description of a preferred embodiment of the invention when taken in conjunction with the accompanying drawings, in which like reference numerals designate like parts throughout the several views and where:

DESCRIPTION OF A PREFERRED EMBODIMENT

Figure 1:
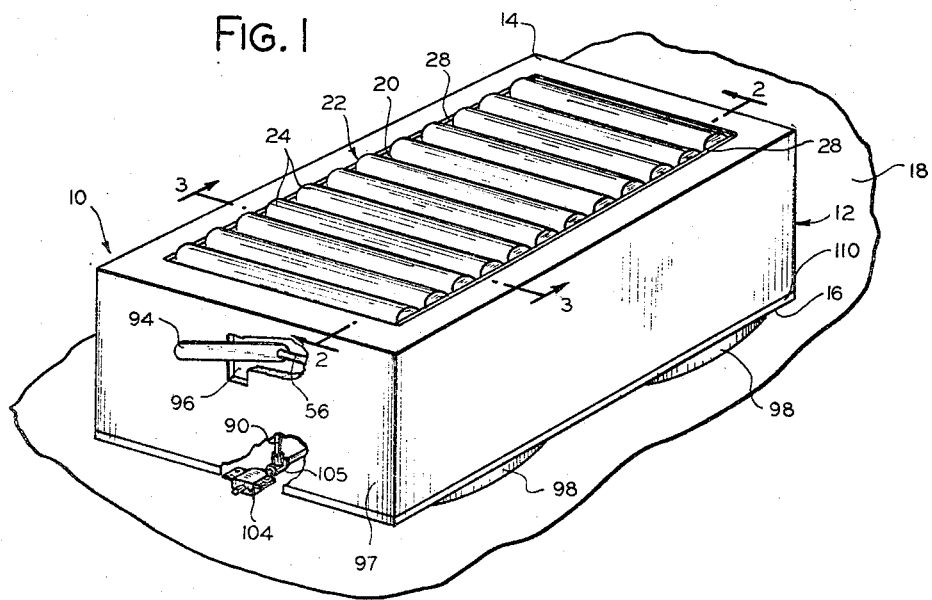
FIGURE 1 is a perspective view of a material handling pallet constructed in accordance with the present invention with a portion of the base support member being broken away to illustrate the lock releasing control lever.

Referring now to the drawings, and in particular to FIGURE 1, a material handling pallet constructed in accordance with the present invention is illustrated generally at reference numeral 10. The pallet 10 includes a base support member, indicated generally at reference numeral 12, having a generally rectangular shape with an upper surface 14 and an underside or lower surface 16, the upper and lower surfaces 14 and 16, respectively, being in substantially parallel relation. The material handling device 10 is adapted to be moved along a supporting floor surface 18 which may comprise the floor of a work or storage area, or alternatively, the raised supporting surface of a working area which locates the work pieces such that they are readily accessible to operators as they are moved along the support surface on material handling pallets.

Figure 2:
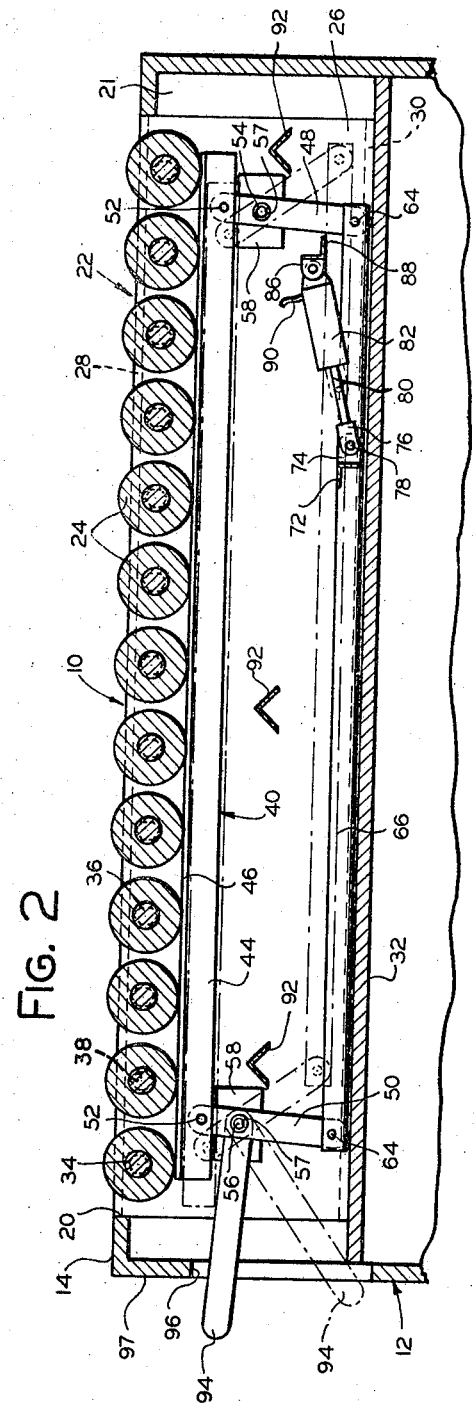
FIGURE 2 is a partial vertical sectional view taken substantially along the line 2—2 of FIGURE 1, viewed in the direction of the arrows, illustrating the locking mechanism for selectively preventing rotation of the roller members and the manually operable lock releasing mechanism.
Figure 3:
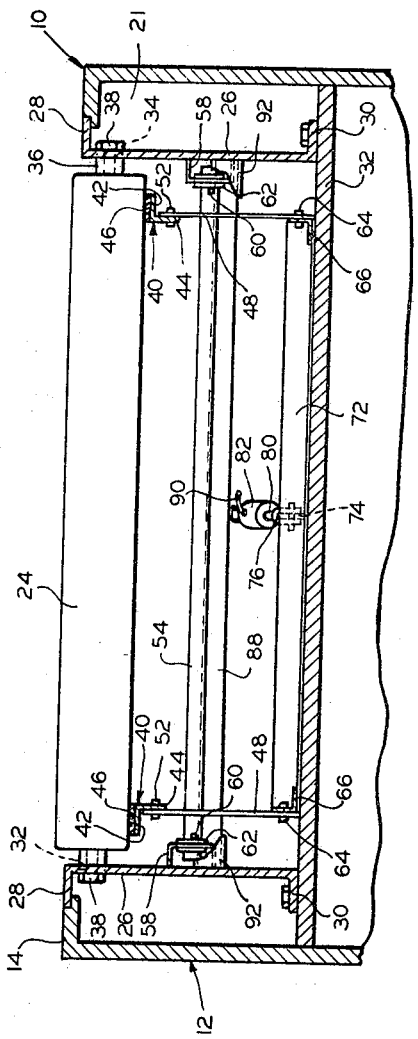
FIGURE 3 is a partial vertical sectional view taken substantially along the line 3—3 of FIGURE 1, viewed in the direction of the arrows, partially illustrating the roller supporting frame and locking mechanism.

Referring now to FIGURE 1, taken in conjunction with FIGURES 2 and 3, the upper surface 14 of the base support member 12 includes a generally rectangular opening 20 therein having a cavity 21 therebelow which receives a roller assembly, indicated generally by reference numeral 22. The roller assembly 22 comprises a plurality of cylindrical roller members 24 which are rotatably supported in parallel spaced generally planar relation between a pair of spaced parallel channel members 26. The spaced channel members 26 are suitably secured to and supported by the base support member 12 within the rectangular opening 20 and cavity 21 through upper and lower flange portions 28 and 30, respectively, which are secured, respectively, to the upper surface portion 14 of the base support member 12 and a support member 32 formed integral with or otherwise suitably secured to the base support member. The channel members 26 are provided with a plurality of generally hexagon-shaped apertures 34 (FIGURE 2) spaced equidistantly downwardly from the upper flange portions 28 in spaced relation along the longitudinal lengths of the channel members such that each hexagon-shaped aperture is disposed opposite a similar aperture in the opposing channel member. Each opposing pair of hexagon-shaped apertures 34 serves to support a cylindrical shaft 36 through receiving and supporting similar hexagon-shaped end portions 38 formed on the cylindrical shafts. Each of the cylindrical shafts 36, in turn, serves to rotatably support a roller member 24, with the cylindrical rollers being thus supported in parallel spaced relation as above noted. The diameters of the respective roller members 24 and the location of their axes of rotation below the upper surface 14 of the base support member 12 are selected such that the uppermost elements of the outer peripheral surfaces of the rollers lie in a plane parallel to and spaced above the plane of the upper surface 14 of the base member. In this manner, it can be seen that a load may be readily received on the rollers 24 and will be spaced from the upper surface 14 of the base support member.

The parallel spaced channel members 26 also serve to support a locking means for operative association with the roller members 24 to selectively engage the rollers and prevent rotation thereof. The locking means is disposed within the cavity 21 of the base support member 12 generally below the roller members 24. The locking means includes a pair of friction locking members, indicated generally at reference numeral 40, which are supported in transverse relation to the longitudinal axes of the roller members 24 and preferably have longitudinal lengths sufficient to underlie all of the roller members. Each of the friction locking members 40 comprises a generally L-shaped channel having a horizontal leg portion 42 and a downwardly extending leg portion 44. The horizontally extending leg portions 42 have friction members 46 suitably secured to the upper surfaces thereof, with the friction members 46 extending the full lengths of the friction locking members 40. The friction members 46 may comprise rough topped leather straps or other suitable material having a high coefficient of friction and relatively long wear life. As will be more fully described hereinbelow, the friction locking members 40 are adapted for selective movement into engaging relation with the roller members 24 such that the friction members 46 engage the peripheral surfaces of the rollers 24 to prevent rotation thereof.

Each of the downwardly extending leg portions 44 of the friction locking members 40 is pivotally connected to the upper ends of a pair of supporting link members 48 and 50 through support pins 52. The supporting link members 48 are preferably fixedly secured on a rotatably mounted cylindrical shaft 54 extending between the spaced channel members 26. The supporting link members 50 are similarly fixedly secured on a rotatably mounted cylindrical shaft 56 extending between the spaced channel members 26. The supporting links 48 and 50 are provided with apertures 57 therethrough which receive the shafts 54 and 56, respectively, and may be secured to the shafts in any conventional manner, such as by tack welding or through-pins (not shown). The shafts 54 and 56 have lengths less than the distance between the spaced channels 26 and have their respective end portions rotatably supported by generally C-shaped bracket members 58 which in turn are suitably secured to the opposing inner surfaces of the spaced channel members 26. The ends of the respective shafts 54 and 56 are rotatably received within corresponding apertures provided in the bracket members 58 and may be retained therein to prevent axial movement of the shafts in a conventional manner, such as by transverse press pins 60 which abut annular spacers 62 disposed on the shafts between the pins 60 and the associated support brackets 58. The shafts 54 and 56 are rotatably supported equidistantly from the upper flange portions 28 of the channel members 26 in parallel relation to each other such that the supporting link members 48 and 50 form pairs of parallel links, each pair comprising one of the links 48 and one of the links 50, as viewed in FIGURE 2.

The ends of the supporting links 48 and 50 opposite the pivotal pin connections 52 are pivotally connected through pins 64 to a pair of parallel spaced rail members 66 adjacent the ends thereof such that a pair of parallel links 48, 50 is connected to each of the rails 66. The distance between the pivotal pin connection 52 and 64 for each of the links 48 and 50 is equal so that each pair of links 48, 50 and their associated friction locking member 40 and rail member 66 forms a parallelogram linkage arrangement.

A cross member 72 is fixedly secured to and between the opposing surfaces of the parallel rail members 66 in normal relation thereto. The cross member 72 includes a projecting portion 74 intermediate its length which serves to pivotally support a U-shaped bracket member 76 through a support pin 78. The U-shaped bracket 76 is fixedly secured to the outer end of an extensible piston 80 of a cylinder-piston assembly 82. The end of the cylinder-piston assembly 82 opposite the extensible piston 80 is pivotally connected through a pin 84 to a projecting bracket 86 formed integral with or otherwise suitably secured to a cross channel member 88 intermediate the ends thereof. The cross channel 88 is fixedly secured between the spaced parallel channel members 26 such that it is in generally parallel relation to the cross member 72. The cylinder-piston assembly 82 includes a suitable fluid pressure conduit 90 to allow fluid pressure, such as air pressure, to be introduced into the cylinder to effect extension of the piston member 80. The cylinder-piston assembly 82 is of a conventional construction wherein the piston 80 may be readily moved to a retracted position when the effective fluid pressure in the conduit 80 is reduced to substantially zero, as when the conduit 90 is connected to a conventional fluid reservoir or to atmosphere when air is used as the working fluid.

The cylinder-piston assembly 82 provides a fluid pressure actuating means for effecting initial actuation of the friction locking members 40 into locking relation with the roller members 24. Noting FIGURE 2, the friction locking members 40 are illustrated in their roller engaging locking positions in solid lines, and in their non-locking at-rest positions in broken lines. When the friction locking members 40 are in their non-locking positions, the friction members 46 are positioned below the roller members 24 thus allowing free rotation of the roller members. When it is desired to lock the roller members 24 against rotation, fluid pressure is supplied to the fluid pressure conduit 90 to extend the piston member 80. Such extension of the piston member 80 will cause the rail members 66 to be moved to the left when viewing FIGURE 2, thus causing clockwise rotation of the supporting link members 48 and 50 with a corresponding rotational movement of the rotatable shafts 54 and 56. Such movement causes the friction members 46 of the friction locking members 40 to engage peripheral surface portions of the rollers 24 to thereby prevent rotation of the rollers. The cylinder-piston assembly 82 provides for a predetermined fixed stroke length or extension length of the piston 80 to limit the movement of the rails 66 and associated supporting links 48 and 50 to the positions shown in solid lines in FIGURE 2. It can be seen that as the supporting link members 48 and 50 are rotated from positions wherein the friction locking members 40 are in non-locking positions (shown in broken lines in FIGURE 2) to positions wherein the friction locking members engage the roller members 24 (shown in solid lines in FIGURE 2), the pin connections 52 of the respective links 48 and 50 pass through the vertical planes containing the center axes of the support shafts 54 and 56. Such overcenter movement is allowed through a slight resiliency in the friction members 46 when the links 48 and 50 are in their true vertical positions during rotary movement thereof. As the links 48 and 50 pass beyond their vertical positions toward their locking positions, the forces form the rollers 24 engaging the friction locking members 40 will urge the link members 48 and 50 and the associated support shafts 54 and 56, respectively, in further clockwise direction, such rotary movement being limited by the controlled extension or stroke of the piston 80 of the cylinder-piston assembly 82.

Preferably, cross members 92 are secured between the parallel spaced channel members 26 in generally normal relation thereto and serve to assist in maintaining the channel members in parallel spaced relation. Noting FIGURE 2, the cross members 92 generally adjacent the supporting links 48 and 50 are preferably positioned so as to limit counterclockwise rotation of the supporting links through engagement with the lower portions thereof when the friction locking members 40 reach their fully non-locking positions as illustrated in broken lines in FIGURE 2.

Manually operable lock releasing means are provided in operative association with the parallelogram linkage arrangement comprising the supporting links 48, 50, the friction locking members 40, and the rail members 66 to allow the operator to manually release the friction locking members 40 from their roller locking positions. As noted above, when the effective fluid pressure in conduit 90 of the cylinder-piston assembly 82 is reduced to substantially zero, the piston member 80 is free to be retracted by an exterior means. The manually operable lock releasing means includes an operating lever 94 which is fixedly secured in generally normal relation to the rotatably mounted support shaft 56 intermediate the ends thereof. The operating lever 94 may be secured to shaft 56 in any suitable manner such as by welding. The operating lever 94 extends outwardly of the base support member 12 through a generally rectangular aperture 96 provided in an end surface 97 of the base support member. Downward movement of the operating lever 94 causes the support shaft 56 to rotate in a counterclockwise direction with a resultant simultaneous counterclockwise rotation of the supporting links 50 which, as noted above, are fixedly secured to the supporting shaft 56. Such counterclockwise rotation of the supporting links 50 effects similar rotational movement of the supporting links 48 through the rail members 66 and friction locking members 40 to thereby move the locking members to their unlocking positions below the rollers 24. Movement of the rail members 66 to the right, as viewed in FIGURE 2, also causes the piston 80 to be retracted into the cylinder-piston assembly 82 preparatory to extension of the piston when it is again desired to lock the rollers 24 against rotation.

Figure 4:
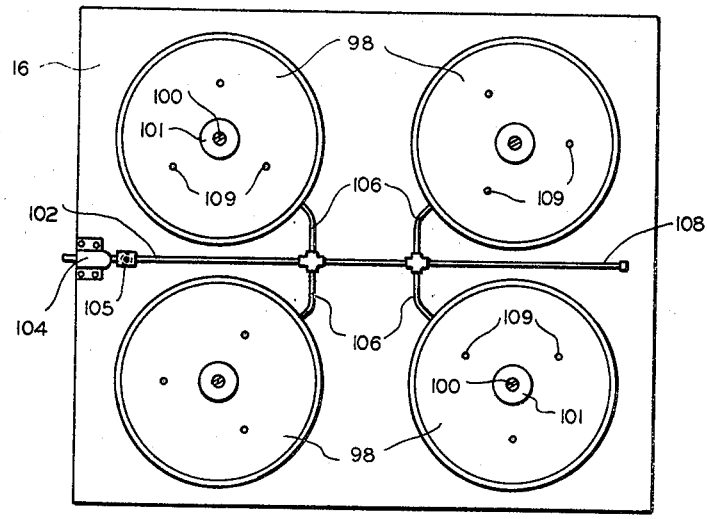
FIGURE 4 is a bottom plan view of the material handling pallet illustrated in FIGURE 1, showing a plurality of inflatable fluid pressure pads and associated conduits for supplying fluid pressure to the pads mounted on the underside of the pallet.

As noted above, the material handling device 10 is adapted to be readily moved along the floor supporting surface 18 with a minimum of frictional resistance. Means are mounted on the underside 16 of the base support member 12 which adapt the device for such movement either with or without a load disposed upon the roller assembly 22 for transportation thereof. Referring to FIGURE 4, taken in conjunction with FIGURE 1, such means preferably comprise a plurality of inflatable pads 98 of known construction suitably mounted on the underside 16 of the base support member 12 through screws 100 and nylon discs 101. For purposes of illustration, four such inflatable pads 98 are mounted on the underside 16 of the pallet and are suitably operatively associated with conduit means comprising a main conduit 102 having a quick disconnect inlet coupling 104 at one end thereof which may be readily connected to a conventional external source of fluid pressure (not shown). Feeder conduits 106 are suitably secured to the inflatable pads 98 and the main conduit 102 for supplying pressurized fluid to the inflatable pads from the source of fluid pressure. An air chamber 108 comprising a generally tubular member is preferably connected coaxially with the main conduit 102 to serve as an air cushion for eliminating substantially all vibration or oscillation of the material handling device when pressurized fluid is being supplied to the inflatable pads 98. If desired, the inflatable pads 98 may be fixedly secured to a platform member 110 which can then be suitably secured to the underside of the base support member 12. The pressurized fluid, such as air, supplied to the inflatable pads 98 is exhausted from the pads through a plurality of openings 109 in the pads with the air then flowing generally radially outwardly between the pads 98 and the supporting surface 18, forming an air film between the supporting surface and the pads. The provision of such an air film between the pads 98 and the supporting surface 18 greatly reduces the coefficient of friction therebetween so that very little effort is required to move the device 10 omnidirectionally over the supporting surface 18. A more detailed description of the inflatable pads 98 and their associated supply and feeder conduits 102 and 106 is set forth in the copending application of Venkat K. Swamy, Ser. No. 503,175, filed Oct. 23, 1965, now Patent No. 3,392,800, and assigned to the assignee of the present invention.

Having described the elements comprising a preferred embodiment of my material handling pallet, its operation will now be briefly described. In general operation, the pallet 10 is positioned in alignment with and adjacent to a conventional roller conveyor with the height of the base support member 12 being such that the roller members 24 thereon lie in a plane generally coincident with the plane of the rollers on the conveyor. A load may then be conveniently transferred from the roller conveyor onto the roller members 24 of the pallet 10. It will be understood that the pallet 10 may be positioned adjacent a roller conveyor by any suitable carrier mechanism, such as a crane device, or the inflatable pads 98 on the pallet 10 may be inflated through the introduction of fluid pressure thereto as above described, and the pallet moved along the supporting floor surface 18 on the thin fluid film established between the pallet and the floor surface. In the latter case, when the pallet 10 is positioned adjacent the roller conveyors, the inflatable pads are exhausted to allow the device to settle to a fixed position on the floor surface 18.

After a load has been placed onto the roller assembly 22, a suitable fluid pressure conduit is connected to the quick disconnect coupling 104 on the end of the main supply conduit 102 to inflate the inflatable pads 98 and thereby establish the above-described fluid film upon which the pallet rides. A conventional tee 105 is suitably coupled to the inlet coupling 104 and adapted to simultaneously direct fluid pressure to the fluid pressure conduit 90 of the cylinder piston assembly 82. As above described, the introduction of fluid pressure into the conduit 90 causes the piston 80 to be extended outwardly from the cylinder-piston assembly 82 to thereby urge the links 48 and 50 in a clockwise direction as viewed in FIGURE 2. Such clockwise rotational movement of the links 48 and 50 on their respective supporting shafts 54 and 56 raises the friction locking members 40 such that the friction members 46 engage the rollers 24. As the supporting links 48 and 50 are rotated through the vertical planes containing the center axes of the support shafts 54 and 56, the friction members 46 are maintained in locking relation against the rollers 24 due to the aforedescribed overcenter arrangement and the controlled extention of the piston 80 to thereby prevent rotation of the rollers. The load positioned on the rollers 24 will thus be fixedly retained thereon, with the possibility of the load rolling off rollers having been eliminated.

With the inflatable pads 98 thus having fluid pressure introduced therein to form a thin fluid film upon which the pallet 10 rides, the pallet may be readily moved to another location on the floor support surface 18. Upon the pallet reaching its destination, the fluid pressure supplied to the inflatable pads 98 is terminated and the pads exhausted, thereby allowing the pallet to settle or bottom out on the support surface 18 such that it will be maintained in a fixed position thereon. Simultaneously with the termination of fluid pressure to the inflatable pads 98, the fluid pressure to conduit 90 will be similarly reduced to a pressure ineffective to maintain the piston 80 in an extended position. Thereafter, the roller members 24 will continue to be maintained in non-rotating locking position due to the overcenter linkage arrangement. When the operator thereafter decides to remove the load from the roller 24, he depresses the control actuating lever 94 to rotate the links 48 and 50 in a counterclockwise direction to thereby lower the friction locking members 40 from their engaging relationships with the rollers 24. The load may thereafter be readily rolled off the rollers 24 and onto another roller conveyor for other storage means.

As above described, the locking mechanism of the subject invention is moved to a locking position upon inflation of the inflatable pads 98 and will be maintained in locking position when the fluid pressure to the pads is terminated or otherwise exhausted therefrom. The locking mechanism according to the present invention thus provides a safety feature which prevents accidental unlocking of the locking mechanism which would allow the load disposed on the rollers 24 to roll off.

While a preferred embodiment of my invention has been shown and described, it will be understood that changes and modifications may be made therein without departing from the invention in its broader aspects.

I claim:

1. A material handling device comprising a base support member having an upper surface and an underside, a plurality of cylindrical roller members supported in generally spaced relation by said base member adjacent the upper surface thereof, locking means including at least one friction locking member adapted to selectively engage said roller members in locking relation and prevent rotation thereof, an overcenter linkage arrangement adapted to support said friction locking member for movement into locking relation with said roller members, fluid pressure actuated means for effecting movement of said friction locking member into said locking relation, manually operable lock releasing means, a plurality of inflatable fluid pressure pads mounted on the underside of said base support member, and fluid conduit means adapted to connect said inflatable pads and said fluid pressure actuated means to a source of fluid pressure.

2. A material handling device comprising a base support, a plurality of rollers connected to said base support for rotation and being adapted to receive a load thereon, locking means actuable between a first position for permitting rotation of said rollers and a second position for preventing rotation of said rollers, fluid film support means connected to said base support, fluid operated means for actuating said locking means from said first position to said second position to prevent rotation of said rollers, and fluid conduit means for connecting said fluid film support and said actuating means to a source of pressurized fluid, said locking means including friction locking member means adapted to engage said rollers when in said second position and maintain said roller engagement when said fluid conduit means is disconnected from the source of pressurized fluid.

3. A material handling device as defined in claim 2 including manually operable lock release means for selectively moving said locking means from said second to said first positions.

4. A material handling device as defined in claim 2 including an overcenter linkage arrangement supporting said friction locking member means for movement between said first and second positions.

References Cited

UNITED STATES PATENTS

| 1,900,149 | 3/1933 | Anderson | 193—35 |
| 2,346,659 | 4/1944 | Bruce. | |
| 2,821,315 | 1/1958 | Bucher | 214—84 X |
| 3,108,671 | 10/1963 | Fuka et al. | 193—35 |
| 3,185,238 | 5/1965 | Coates | 180—125 |
| 3,332,656 | 7/1967 | Johnson et al. | 180—125 |

FOREIGN PATENTS

| 1,200,259 | 6/1959 | France. |

ANDRES H. NIELSEN, Primary Examiner